March 19, 1957     M. B. GOREN     2,786,074
PROCESS OF MAKING ORGANIC ACIDS FROM CARBONACEOUS MATERIALS
Filed Dec. 8, 1952
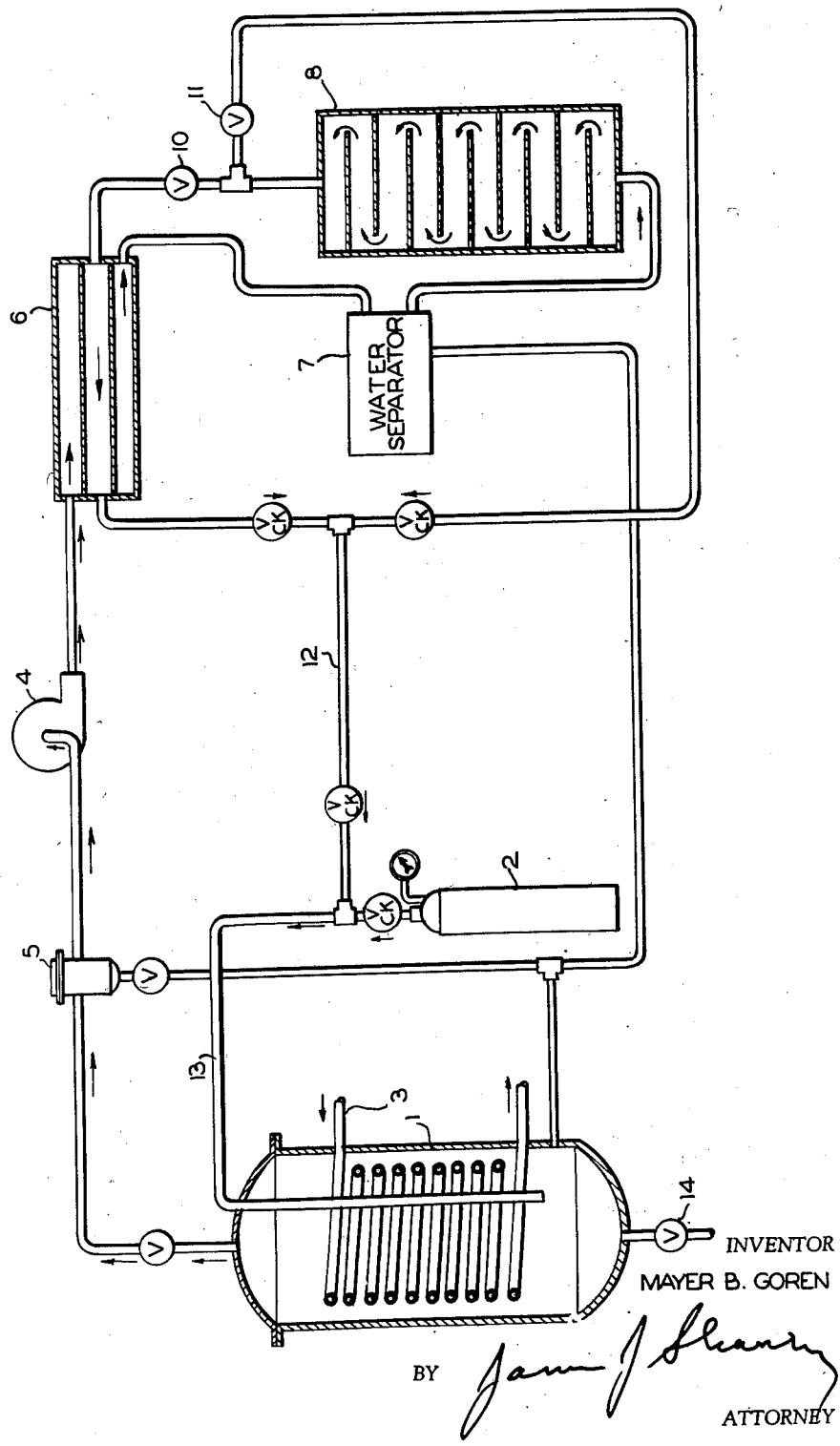
INVENTOR
MAYER B. GOREN
BY
ATTORNEY 2,786,074
Patented Mar. 19, 1957

2,786,074

PROCESS OF MAKING ORGANIC ACIDS FROM CARBONACEOUS MATERIALS

Mayer B. Goren, Oklahoma City, Okla., assignor to Kerr-McGee Oil Industries, Inc., a corporation of Delaware Application December 8, 1952, Serial No. 324,696

8 Claims. (Cl. 260—514)

This invention relates to a process of making organic acids from carbonaceous materials. More particularly, this invention is an improvement on the process for making organic acids by oxidizing carbonaceous materials at elevated temperature and pressure with gaseous oxygen in the presence of an alkaline solution.

By the term "carbonaceous material" as used in this specification is meant coal, coke, carbon black, pitch, humic acids, natural asphalts, synthetic asphalts, or products derived therefrom.

It is known in the prior art that carbonaceous materials may be oxidized by gaseous oxygen in the presence of an aqueous alkaline solution at elevated temperature and pressure and that the resultant organic acids in the form of alkaline salts may be recovered from the alkaline solution by acidification and solvent extraction.

During the oxidation period, all of the carbon of the carbonaceous material passes into solution, about half the carbon content being oxidized to organic acids and forming an alkaline salt of these acids, the balance being oxidized to carbon dioxide and forming an alkaline carbonate. Heretofore, it has been considered necessary to use sufficient alkaline solution to fix all the carbon dioxide formed, assuming about 50% oxidation to carbon dioxide, to insure a constant partial pressure of oxygen. The reason for this is that if sufficient alkaline solution were not used to convert all of the carbon dioxide produced to the carbonate, the partial pressure of oxygen in the system would progressively become lower and lower and the reaction would slow down and eventually cease.

For example, in British Patent 635,088 of April 5, 1950, it will be noted that forty-five pounds of sodium hydroxide dissolved in fifteen gallons of water are necessary for each fifteen pounds of 200 mesh bituminous coal oxidized. It may be shown by calculation that forty-five pounds of sodium hydroxide is the amount necessary to convert slightly over 50% of the carbon present in the coal to sodium carbonate.

Elimination of the requirement for such a high ratio of alkali to carbonaceous material would be desirable for a number of reasons. Of the raw materials required for this process, alkalies, such as sodium hydroxide, are the most expensive. By cutting down on the number of pounds of alkali required per pound of carbonaceous material oxidized, the cost of the organic acids produced could be reduced considerably. Elimination of the necessity of such a large volume of alkaline solution in the high pressure oxidation vessel would increase the capacity of the vessel for oxidizing carbonaceous materials. The by-product carbonate produced in the reaction zone of the prior art process is not pure. If provision could be made for preventing carbon dioxide generated during the process from reducing the partial pressure of the oxygen, the reaction rate could be more readily controlled.

Accordingly, it is an important object of the present invention to eliminate in the production of organic acids from carbonaceous materials, the requirement of a large quantity of alkaline solution within the oxidation zone for converting the carbon dioxide generated to a carbonate.

A further important object of the present invention is to minimize the partial pressure of the carbon dioxide in the reaction zone in the production of organic acids from carbonaceous materials to thereby improve control of the reaction rate.

It is a further important object of the present invention to provide in the production of organic acids from carbonaceous materials for eliminating the presence of large quantities of alkaline solution in the oxidation zone and at the same time to provide for economically utilizing by-product carbon dioxide generated.

These and other objects will become more apparent from the following description of this invention, which may be carried out in the apparatus diagrammatically illustrated in the attached drawing.

The process of the present invention comprises oxidizing a carbonaceous material at elevated temperature and pressure in a reaction zone with gaseous oxygen in the presence of an alkaline solution to produce a solution of alkaline salts of organic acids, withdrawing gas from the reaction zone including carbon dioxide formed during the oxidation, removing carbon dioxide from the withdrawn gas and supplying to the reaction zone effluent gas from the carbon dioxide removal step and gaseous oxygen at a controlled rate to maintain the desired partial pressure of oxygen in the reaction zone during the reaction.

More particularly and with reference to the drawing, a charge of carbonaceous material together with an aqueous alkaline solution is first introduced into the high pressure reactor 1. An oxygen pressure of between 100 to 400 pounds per square inch gauge is then obtained by supplying oxygen from the high pressure source 2. Thereafter, by the use of the heat exchanger 3, the contents of the reactor are brought to a temperature between about 200 and 270° C. As a result the total pressure in the reactor 1 and entire system will then be between about 750 and 1000 pounds per square inch gauge.

The circulating centrifugal blower or compressor 4 is then started and the gases in the system are circulated through the trap 5 for removing entrained liquids, the heat exchanger 6, liquid entrainment separator 7, the carbon dioxide scrubber 8 and thence back to the high pressure reactor 1 through valve 10, exchanger 6, line 12 and line 13.

If no mechanical means of agitation is used in the high pressure reactor 1, the returned gases are preferably introduced below the surface of the alkaline solution in order to provide agitation. If mechanical agitation is used, the returned gases may be introduced just above the liquid level of the alkaline solution.

During the circulation of gases, high pressure oxygen is supplied from the source 2 in order to maintain the pressure of the system at the proper level.

Alkalies suitable for use in the high pressure reactor 1 include sodium hydroxide, potassium hydroxide, and mixtures of these. The minimum amount of soluble alkali used should be about 40% by weight of the carbonaceous material charged. I prefer to use from 75 to 80% by weight of soluble alkali based on the weight of carbonaceous material charged. Aqueous alkaline solutions of from 2 normal base to about 9 normal base may be used for introducing the alkali into the reactor. The preferred range of concentration of these aqueous alkaline solutions is between about 4 and 5 normal base, 4 normal base being the preferred concentration.

The high pressure oxygen supply source may be either pure oxygen or an oxygen containing gas such as air.

The carbon dioxide scrubber 8 may be any form of conventional apparatus used for contacting a gas in order to remove a carbon dioxide constituent therefrom. For example, it may be of the tray type as illustrated or it may be a tower which is filled with a porous mass of materials suitable for removing the carbon dioxide from the gaseous stream as it passes through. Of the various materials which may be employed in the carbon dioxide scrubber, there may be mentioned sodium hydroxide, potassium hydroxide, calcium hydroxide, calcium oxide, lime and soda lime. For example, lime in hydrated or unhydrated form may be charged directly into the scrubber, may be mixed with a carrier such as fuller's earth, or may be used in the form of an aqueous slurry. Potassium or sodium hydroxide may be used in solid form or in an aqueous solution to produce as a valuable by-product relatively pure potassium or sodium carbonate.

The use of the heat exchanger 6 in the system described is optional and this heat exchanger may be by-passed if desired by closing valves 10 and opening valve 11.

Entrained liquid removed from the circulating gases by trap 5 and liquid entrainment separator 7 may be returned to high pressure reactor 1 for the recovery of any organic acid content thereof.

Upon completion of the reaction, the contents of the reactor 1 are withdrawn through valve 14. This withdrawn solution containing the alkaline salts of organic acids is preferably then filtered to remove insoluble ash product therefrom. Thereafter, sufficient acid in the form of sulphuric acid or hydrochloric acid may be added to form the desired organic acids. After extraction with an appropriate solvent such as ethyl ether, methyl ethyl ketone or isopropyl ether, distillation and drying, a mixture of organic acids which are solid and range in color from a light yellow to a dark brown is obtained.

One might expect that the utilization of an amount of aqueous alkaline solution in reaction vessel 1 less than that necessary to convert all of the carbon dioxide generated to the carbonate, and insufficient to solubilize the intermediate organic products of oxidation for further homogenous reaction, would result in a displacement of these intermediate products from solution by the build up in concentration of carbon dioxide, and moreover in the prevention of further reaction owing to the concomitant decrease in partial pressure of the oxygen. However, this does not occur as evidenced by the fact that the reaction proceeds with little carbonate present in the reaction vessel upon completion of the oxidation. It is believed that the explanation of this may be that the reaction proceeds in such a manner that the carbon dioxide formed in the reaction and initially dissolved in the reaction mixture as a carbonate, is displaced from solution by reaction of the carbonate with the humic acids formed in the initial solubilization of the carbonaceous material owing to the greater acid ionizaion constant of the latter as compared with that of carbonic acid. If this displaced carbon dioxide were allowed to accumulate in reaction vessel 1 and thereby reduce the partial pressure of oxygen in the system by dilution, the reaction would slow down and eventually cease. This, however, is not allowed to occur since the carbon dioxide scrubber removes the carbon dioxide from the system.

The purpose of the strong alkaline solution in the prior art process is to permit the reaction to proceed which it would not otherwise do. The reaction rate is maintained at a high level, in the prior art process, owing to the fact that by dissolving it in the reaction mixture as formed, the carbon dioxide is prevented from building up in the gas phase, where it would eventually cause the reaction to stop. In my invention, the reaction rate is maintained by absorbing the carbon dioxide in an adjacent vessel charged with either the same absorbing solution (sodium hydroxide) or a cheaper absorbent (lime) which cannot effectively be used in the reaction vessel. By decreasing the rate of scrubbing, the reaction rate can be slowed down at will which is not the case in the prior art process.

The following examples are for the purpose of illustrating this invention:

Example 1

100 grams of finely divided bituminous coal (minus 100 mesh) is thoroughly wet with 500 ml. of 4 normal sodium hydroxide and charged into a nickel clad high pressure autoclave of 3 liter capacity which is connected to a carbon dioxide scrubber and source of oxygen as diagrammatically illustrated in the drawing. 700 grams of lime is mixed with an equal weight of water to hydrate the former and make a thick paste. To this paste is added 560 grams of 20 to 40 mesh fuller's earth which has previously been fired to 426.7° C. After thorough mixing, the resulting mass affords a crumbly moist mixture which is charged into the carbon dioxide scrubber of the system. The high pressure autoclave is charged with oxygen gas to a pressure of 350 pounds per square inch gauge and the compressor for circulating the gases in the system is started. The autoclave and its contents are slowly heated to a temperature of 260±10° C. At this temperature the maximum pressure is about 860 pounds per square inch gauge. This pressure is maintained by regulating the oxygen flow during the reaction in order to maintain a partial pressure of oxygen which causes the reaction to proceed at the desired rate. Circulation of the gases through the carbon dioxide scrubber and introduction of the return gases beneath the surface of the alkali solution provides sufficient agitation for the reaction mixture. These conditions are maintained for approximately 3 hours and the system is allowed to cool.

The reactor is then discharged and the aqueous solution of organic acids is filtered in order to remove a small amount of insoluble ash material. The filtrate is acidified with 130 grams of 95% sulphuric acid, rock salt being added so as to saturate the solution. As a result, a small amount of insoluble dark gummy material is separated. The solution is then continuously extracted with methyl ethyl ketone and the organic acids separated from the methyl ethyl ketone by distillation and dried. The yield of organic acids which are yellowish brown in color is 41 grams.

The charge in the carbon dioxide scrubber is regenerated by calcining and then rewetted with enough water to give a crumbly moist mass suitable for a further carbon dioxide scrubbing operation.

Example 2

A vacuum reduced asphalt of 89 penetration and having a softening point (ring and ball) of 48.9° C. is treated with 10 volumes of pentane and the precipitated asphaltenes are filtered, washed with pentane and dried. The product is powdered and slowly heated in a current of dry air to a final temperature of 200° C. which is maintained for six weeks. At the end of this time the product exhibits considerable solubility in an aqueous alkaline solution, the asphaltenes evidently being converted into humic acids.

100 grams of these humic acids is suspended and partially dissolved in 400 ml. of water containing 40 grams of sodium hydroxide and this mixture is charged into a nickel clad high pressure autoclave of 3 liter capacity. The carbon dioxide scrubber is charged with 260 grams of sodium hydroxide dissolved in 800 ml. of water and the reaction is carried out as described above in connection with Example 1 except that 60 grams of sulphuric acid is used to neutralize and acidify the contents of the reaction vessel. Extraction of this aqueous solution with isopropyl ether affords, on evaporation of the solvent, 44 grams of yellow, solid organic acids.

The solution in the carbon dioxide scrubber deposits a considerable quantity of sodium carbonate upon cooling to room temperature. By chilling this mixture further and filtering about 280 grams of relatively pure sodium carbonate is obtained as a valuable by-product of the oxidation.

Example 3

The pentane soluble fraction obtained in the preparation of the asphaltenes used in Example 2 is a mixture of asphaltic resins and oils. This pentane soluble fraction is coked by low temperature coking. 100 grams of the resultant coke is thoroughly wet with 500 ml. of 5 normal sodium hydroxide and charged into a nickel clad high pressure autoclave of 3 liter capacity, forming part of a system such as diagrammatically illustrated in the drawing. 685 grams of lime is mixed with an equal weight of water to hydrate the same and produce a thick paste. To this paste is added 540 grams of 20 to 40 mesh fuller's earth which had previously been fired to 426.7° C. The resulting mass is well mixed to afford a crumbly moist mixture and this is charged into a carbon dioxide scrubber such as illustrated diagrammatically in the drawing.

The reactor is charged with oxygen gas to a pressure of 350 pounds per square inch gauge and the compressor for circulating the gases in the system is started. The autoclave and its contents are slowly heated to a temperature of 260±10° C. At this temperature the maximum pressure recorded is about 850 pounds per square inch gauge which is maintained by regulating the oxygen flow at intervals in order to maintain a partial pressure of oxygen which would cause the reaction to proceed at the desired rate. These conditions are maintained for approximately three hours and the system is then allowed to cool.

The reactor is then discharged and the aqueous solution of organic acids filtered to remove a small amount of insoluble ash material. The filtrate is acidified with 150 grams of 95% sulphuric acid. Rock salt is added to saturate the solution and as a result a minor amount of insoluble dark gummy material is separated. The solution is then continuously extracted with methyl ethyl ketone and the organic acids are separated from the methyl ethyl ketone solvent by distillation. Upon drying, these acids are of a brownish yellow color and weigh 35 grams.

I claim:

1. In a process for producing organic acids wherein carbonaceous material is oxidized with oxygen in a reaction zone at elevated temperature and pressure in the presence of an alkaline solution to produce a solution of alkaline salts of organic acids, the improvement comprising oxidizing each 100 parts by weight of the carbonaceous material in the presence of an aqueous alkaline solution containing initially between about 40 parts by weight and 100 parts by weight of water soluble alkali while controlling the rate of oxidation, the rate of oxidation of the carbonaceous material being controlled by withdrawing from the reaction zone gas containing carbon dioxide formed during the oxidation of the carbonaceous material, removing carbon dioxide from the withdrawn gas outside of the reaction zone, passing effluent gas from the carbon dioxide removal step to the reaction zone, and supplying oxygen to the reaction zone at a sufficient rate to maintain a partial pressure of oxygen in the reaction zone of at least two atmospheres and such as to control the rate of oxidation of the carbonaceous material within desired limits.

2. The process of claim 1 wherein the carbonaceous material is coal.

3. The process of claim 1 wherein the carbonaceous material is petroleum coke.

4. The process of claim 1 wherein the carbonaceous material is humic acids.

5. In a process for producing organic acids wherein carbonaceous material is oxidized with oxygen in a reaction zone at elevated temperature and pressure in the presence of an alkaline solution to produce a solution of alkaline salts of organic acids, the improvement comprising oxidizing at a temperature of about 200 to 270° C. each 100 parts by weight of the carbonaceous material in the presence of an initially 2 Normal to 9 Normal aqueous solution containing initially between about 40 parts by weight and 100 parts by weight of at least one hydroxide selected from the class consisting of the hydroxides of sodium and potassium while controlling the rate of oxidation, the rate of oxidation of the carbonaceous material being controlled by withdrawing from the reaction zone gas containing carbon dioxide formed during the oxidation of the carbonaceous material, removing carbon dioxide from the withdrawn gas outside of the reaction zone, passing the effluent gas from the carbon dioxide removal step to the reaction zone, and supplying oxygen to the reaction zone at a sufficient rate to maintain a partial pressure of oxygen in the reaction zone of at least two atmospheres and such as to control the rate of oxidation of the carbonaceous material within desired limits.

6. The process of claim 5 wherein the carbonaceous material is coal.

7. The process of claim 5 wherein the carbonaceous material is petroleum coke.

8. The process of claim 5 wherein the carbonaceous material is humic acids.

References Cited in the file of this patent

UNITED STATES PATENTS

| | | |
|---|---|---|
| 2,193,337 | Leicester | Mar. 12, 1940 |

FOREIGN PATENTS

| | | |
|---|---|---|
| 149,974 | Great Britain | Nov. 3, 1921 |
| 635,008 | Great Britain | Apr. 5, 1950 |